United States Patent
Tobata et al.

(10) Patent No.: US 10,470,577 B2
(45) Date of Patent: Nov. 12, 2019

(54) SEAT PAD AND METHOD FOR MANUFACTURING SEAT PAD

(71) Applicants: TACHI-S CO., LTD., Tokyo (JP); BRIDGESTONE CORPORATION, Tokyo (JP)

(72) Inventors: Hideo Tobata, Tokyo (JP); Junpei Yoshikawa, Tokyo (JP); Jun Takano, Tokyo (JP); Kazuo Noguchi, Tokyo (JP); Kenji Kumagai, Tokyo (JP)

(73) Assignees: TACHI-S CO., LTD., Tokyo (JP); BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/536,053

(22) PCT Filed: Nov. 26, 2015

(86) PCT No.: PCT/JP2015/083144
§ 371 (c)(1),
(2) Date: Jun. 14, 2017

(87) PCT Pub. No.: WO2016/098550
PCT Pub. Date: Jun. 23, 2016

(65) Prior Publication Data
US 2017/0354261 A1 Dec. 14, 2017

(30) Foreign Application Priority Data
Dec. 15, 2014 (JP) .................................. 2014-253238

(51) Int. Cl.
*B60N 2/56* (2006.01)
*A47C 7/74* (2006.01)
(Continued)

(52) U.S. Cl.
CPC ................ *A47C 7/74* (2013.01); *A47C 27/14* (2013.01); *B29C 43/18* (2013.01); *B60N 2/5642* (2013.01); *B60N 2/5657* (2013.01); *B60N 2/5664* (2013.01)

(58) Field of Classification Search
CPC ........... A47C 7/74; A47C 27/14; B29C 43/18; B60N 2/5642; B60N 2/5657; B60N 2/5664
See application file for complete search history.

(56) References Cited

U.S. PATENT DOCUMENTS 4,571,763 A * 2/1986 Suzuyama ............... A47C 7/18
297/452.27
8,864,238 B2 * 10/2014 Oota ....................... B29C 33/10
297/452.42
(Continued)

FOREIGN PATENT DOCUMENTS

| JP | 2013-198730 A | 10/2013 |
| JP | 2012-100910 A | 5/2014 |

(Continued)

OTHER PUBLICATIONS

International Search Report for PCT/JP2015/083144 dated Mar. 1, 2016; English translation submitted herewith (5 pages).

*Primary Examiner* — Philip F Gabler
(74) *Attorney, Agent, or Firm* — Fitch, Even, Tabin & Flannery, LLP

(57) ABSTRACT

It is provided a seat pad having excellent comfort in seating with improved air permeability and cushion durability in a seat pad of the vehicle seat. The seat pad includes an air permeable member having a ventilation n function with an outside. The seat pad is integrally foam molded using a foamed resin material in a state where the air permeable member is introduced. The seat pad has a surface of the air permeable member projecting with respect to a surface of
(Continued)

the seat pad located at a closest position to the air permeable member.

15 Claims, 9 Drawing Sheets

(51) Int. Cl.
    *A47C 27/14*         (2006.01)
    *B29C 43/18*         (2006.01)

(56) References Cited

U.S. PATENT DOCUMENTS

| | | | |
|---|---|---|---|
| 9,901,181 B2 * | 2/2018 | Miyata | A47C 27/22 |
| 9,956,706 B2 * | 5/2018 | Mogi | B29C 44/1276 |
| 10,106,064 B2 * | 10/2018 | Kumagai | A47C 27/14 |
| 2013/0214583 A1 | 8/2013 | Uramichi et al. | |
| 2017/0021750 A1 | 1/2017 | Kumagai et al. | |
| 2017/0100860 A1 * | 4/2017 | Kumagai | A47C 27/14 |

FOREIGN PATENT DOCUMENTS

| | | |
|---|---|---|
| JP | 2014-079318 A | 5/2014 |
| JP | 2014-104051 A | 6/2014 |
| JP | 2015-198760 A | 11/2015 |
| JP | 2015-217146 A | 12/2015 |

* cited by examiner

9

8   8

SEAT PAD AND METHOD FOR MANUFACTURING SEAT PAD

CROSS-REFERENCE TO RELATED APPLICATIONS

This application is a U.S. national phase application filed under 35 U.S.C. § 371 of International Application No. PCT/JP2015/083144, filed Nov. 26, 2015, designating the United States, which claims priority from Japanese Patent Application No. 2014-253238, filed Dec. 15, 2014, which are hereby incorporated herein by reference in their entirety.

TECHNICAL FIELD

The present invention relates to a seat pad of a vehicle seat and a method for manufacturing the same.

BACKGROUND ART

A vehicle seat, such as a seat for an automobile, is subjected to various requests for comfort in seating, such as air permeability and cushion durability, as well as basic performance of the vehicle seat, such as safety, getting in/out efficiency, and holdability.

As a background art relates to cushionability of the vehicle seat, for example, there is provided a technique, such as Japanese Patent Application Laid-Open No. 2013-198730 (Patent Literature 1). Patent Literature 1 discloses "a cushion pad of a vehicle seat on which a seating person seats including a soft foamed resin that occupies an affecting area of a seating load, and an elastic three-dimensional network that is arranged at positions on both sides opposing with a center portion of the affecting area in between in the foamed resin."

According to the above-described cushion pad of the vehicle seat, a cushion pad that is comfortable to sit on even though the cushion pad is thin is providable.

CITATION LIST

Patent Literature

PTL 1: Japanese Patent Application Laid-Open No. 2013-198730

SUMMARY OF INVENTION

Technical Problem

In the conventional seat for an automobile, typically, a urethane foam that is made by a foamed resin material being foamed in a cavity of a metallic mold is used as a cushion material. However, the urethane foam has poor air permeability that easily causes stuffiness.

There has been a technique that installs an air permeable member on an upper portion of the cavity of the metallic mold and combines the air permeable member with the urethane foam in the cavity. This, however, fails to provide a ventilation performance due to this air permeable member being brought to a back surface side of an elastic body (the urethane foam) when used as a vehicle seat.

There also has been a technique that provides the air permeability by combining the air permeable member with a lower surface of a non-foaming urethane. This, however, is inferior in performance as an elastic body due to the non-foaming urethane.

Furthermore, there has been a technique that disposes an air flow passage by covering one side of the urethane foam having a ditch structure with another member. This, however, inevitably increases process in manufacturing.

The technique in Patent Literature 1 described above has an elastic modulus higher than an elastic modulus of a polyurethane foam (the urethane foam) since a front released C-shaped three-dimensional net-shaped elastic body is arranged in a state of being submerged inside the polyurethane foam. This, however, is insufficient to fulfill the performance requested in the cushion durability, because, for example, the cushion collapses during a long-distance driving and the collapsed cushion is hard to recover.

Then, an object of the present invention is to provide a seat pad having excellent comfort in seating with improved air permeability and cushion durability in a seat pad of a vehicle seat.

Another object of the present invention is to provide a method for manufacturing a seat pad of a vehicle seat having excellent comfort in seating with improved air permeability and cushion durability.

Solution to Problem

The present invention provides a seat pad that includes an air permeable member having a ventilation function with an outside. The seat pad is integrally foam molded using a foamed resin material in a state where the air permeable member is introduced. The seat pad has a surface of the air permeable member projecting with respect to a surface of the seat pad located at a closest position to the air permeable member.

The present invention provides a method for manufacturing a seat pad that includes (a) a step of disposing an air permeable member in a cavity of a metallic mold and filling a foamed resin material in the cavity of the metallic mold, and (b) a step of compressing the air permeable member by closing the metallic mold and causing the foamed resin material to be foamed in the cavity in a state where the air permeable member is compressed.

Advantageous Effects of Invention

According to the present invention, a seat pad having excellent comfort in seating with improved air permeability and cushion durability in a seat pad of a vehicle seat is achievable.

According to the present invention, a method for manufacturing a seat pad of a vehicle seat having excellent comfort in seating with improved air permeability and cushion durability is achievable.

Problems, configurations, and effects other than ones described above will be made apparent from the following description of embodiments.

DESCRIPTION OF EMBODIMENTS

The following describes embodiments of the present invention with reference to the drawings.

Embodiment 1

Figure 12:
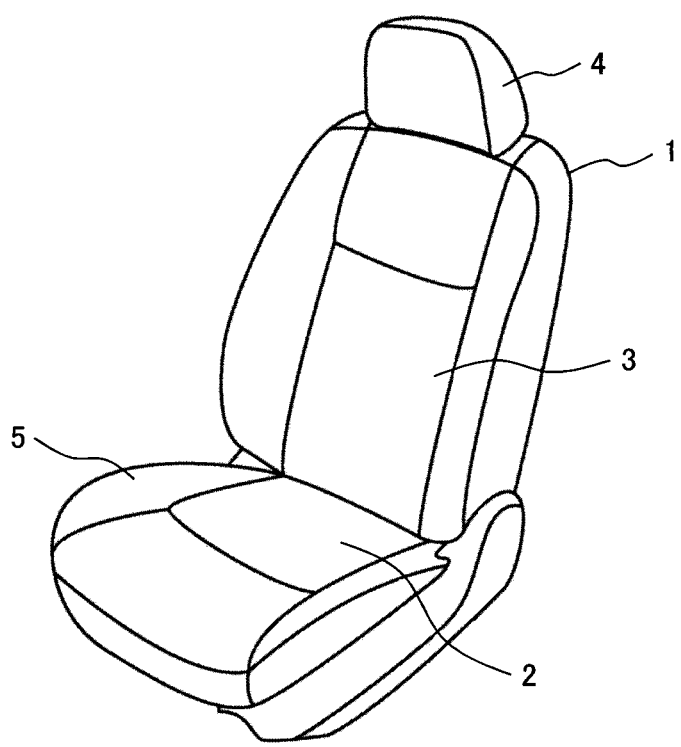
FIG. 12 is a diagram illustrating a whole outline of a common vehicle seat.

First, with reference to FIG. 12, a common vehicle seat used for an automobile and the like will be described. FIG. 12 illustrates a whole outline of the common vehicle seat. A vehicle seat 1 includes a cushion pad 2, a back pad 3, and a head rest 4 as its main parts. The cushion pad 2 serves as a seating surface of the seat. The back pad 3 is disposed at a back side of the cushion pad 2 and serves as a backrest portion of the seat. The head rest 4 is disposed at an upper portion of the back pad and protects a head and neck region of a passenger. On both sides of the cushion pad 2, side supports 5 are disposed to serve as supports of side portions of the seating surface.

Figure 10:
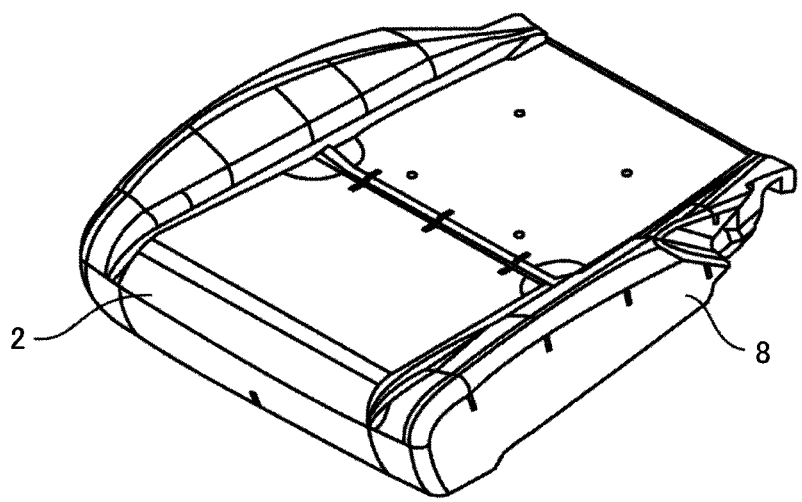
FIG. 10 is a cross-sectional view of a conventional vehicle seat.

With reference to FIG. 10 and FIG. 11A to FIG. 11C, a problem to be solved by the present invention will be described in more detail. FIG. 10 is a perspective view of a seat pad 8, namely a urethane pad that serves as a base of a cushion without a seat cover (a trim cover) in the cushion pad 2 of a conventional vehicle seat. In the conventional vehicle seat, urethane foam is used as a cushion material. The urethane foam is typically made by foaming a foamed resin material inside a cavity of a metallic mold. However, as described above, the urethane foam has poor air permeability that easily causes stuffiness.

Figure 11A:
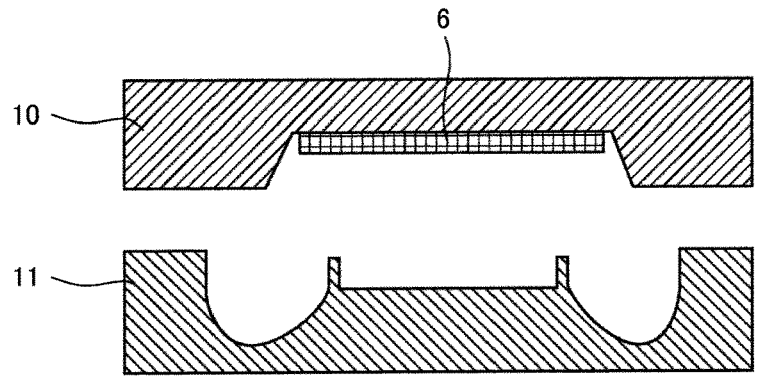
FIG. 11A is a diagram illustrating a manufacturing process of the conventional vehicle seat.
Figure 11B:
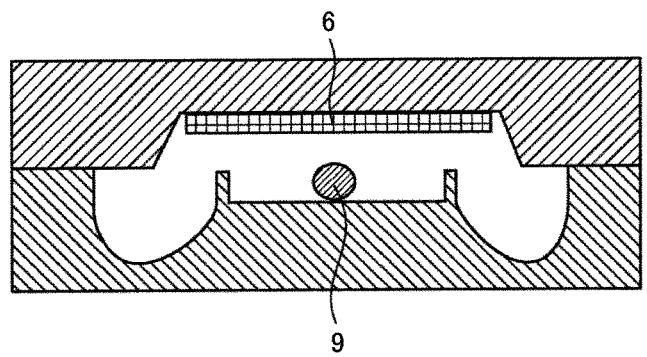
FIG. 11B is a diagram illustrating the manufacturing process of the conventional vehicle seat.
Figure 11C:
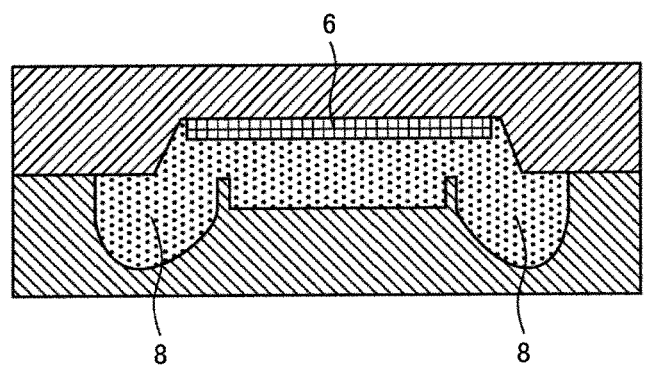
FIG. 11C is a diagram illustrating the manufacturing process of the conventional vehicle seat.

As illustrated in FIG. 11A to FIG. 11C, there has been a technique that disposes an air permeable member 6 at an upper portion of the urethane foam. In the technique, the air permeable member 6 is installed on an upper portion in a cavity side of an upper metallic mold 10 (FIG. 11A), a urethane foamed resin 9 is filled into the cavity of the metallic mold (FIG. 11B), and the urethane is foamed inside the cavity to combine the air permeable member 6 with the seat pad 8 (FIG. 11C).

However, this fails to provide a ventilation performance due to this air permeable member 6 being brought to a back surface side (a lower surface side) of an elastic body, namely the seat pad 8 when used as a vehicle seat.

Figure 1:
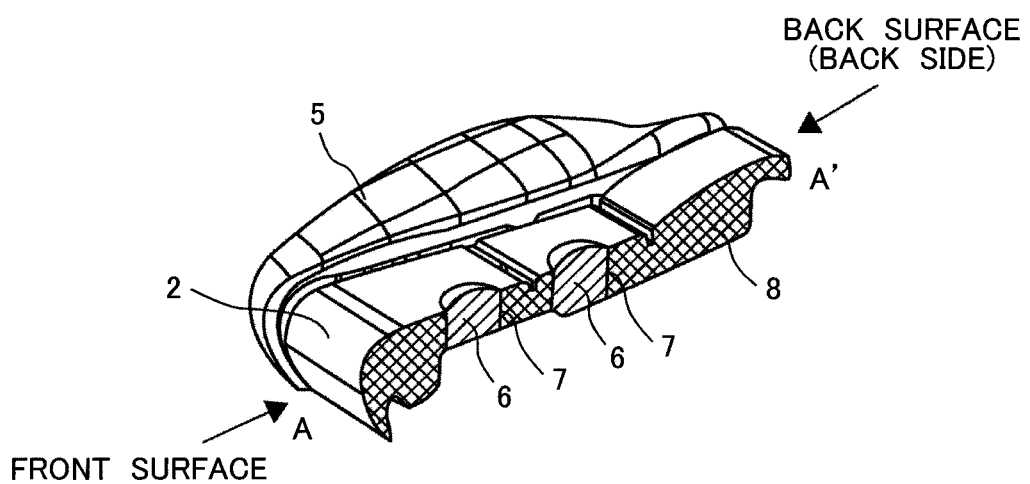
FIG. 1 is a partially cutout cross-sectional perspective view of a vehicle seat according to one embodiment of the present invention.

Next, with reference to FIG. 1 and FIG. 2, a vehicle seat according to an embodiment 1 of the present invention will be described. FIG. 1 is a partially cutout cross-sectional perspective view of a cushion pad of the vehicle seat according to the embodiment. FIG. 1 illustrates a state where the seat cover (the trim cover) of the cushion pad 2 is removed in order to show the feature of the present invention in a simple manner.

As illustrated in FIG. 1, the cushion pad 2 of the vehicle seat in this embodiment has a plurality of openings that pass through a part of the seat pad 8 (a urethane pad), which serves as a cushion base, from a top surface to a lower surface. The opening has an inner wall along which a covering member 7 made of a cloth material {a fabric (a nylon half), a nonwoven fabric} is disposed. Inside the opening, the air permeable member 6 that is compressed via the covering member 7 is filled.

Figure 2:
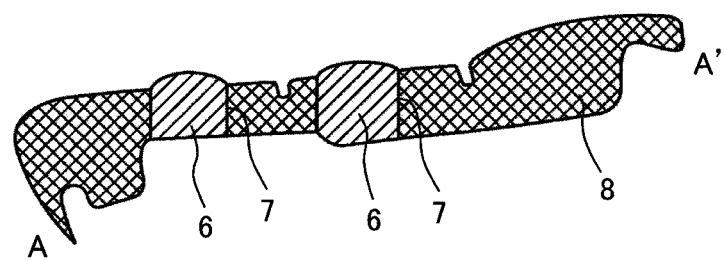
FIG. 2 is a part of a cross-sectional view of the vehicle seat according to the one embodiment of the present invention.

FIG. 2 illustrates a cross-sectional surface taken along A-A' in FIG. 1. Here, as illustrated in FIG. 2, a surface of the air permeable member 6 filled inside the opening is disposed projecting in a convex shape with respect to a surface of the seat pad 8 adjacent to the opening in a top surface side of the urethane pad, namely the seat pad 8. This is because the air permeable member 6, which is covered with the covering member 7 made of the cloth material {the fabric (the nylon half), the nonwoven fabric} on a side surface, is filled in the opening of the seat pad 8 in a state of being compressed. Therefore, in the opening portion in the top surface side of the seat pad 8, the air permeable member 6 projects from the surface of the seat pad 8 by a restoring force that encourages the air permeable member 6 to return from the compressed state to an original state.

Thus, filling the air permeable member 6, which is compressed via the covering member 7, in the opening disposed in a part of the urethane pad, namely the seat pad 8 causes the air permeable member 6 to project with respect to the urethane surface adjacent to the opening to improve cushion durability of the cushion pad 2. The air permeable member 6 has high air permeability compared with the seat pad 8. Therefore, using the cushion pad 2 described in this embodiment ensures improving the air permeability of the vehicle seat and the cushion durability.

For a material of the covering member 7, namely the cloth material {the fabric (the nylon half), the nonwoven fabric}, which is disposed so as to be along the inner wall of the opening of the seat pad 8 as described above, a material knitted with two reeds, what is called a lock-knit (also referred to as a tricot half), nonwoven fabric or the like is used.

For a material of the air permeable member 6, which is filled in the opening of the seat pad 8 in a state of being compressed, Polyethylene-Terephthalate (PET), Polypropylene (PP) or the like is used. This air permeable member 6 can obtain an elastic force by using a core-sheath structured fiber and compression molding the fiber.

The air permeable member 6 has the high air permeability compared with the seat pad 8, thereby ensuring an improved air permeability and cushion durability, that is, an improved comfort in seating.

As described above, with the vehicle seat of the embodiment 1, the air permeability and the cushion durability of the vehicle seat are improved to ensure achieving the vehicle seat having excellent comfort in seating.

In this embodiment, shapes of the plurality of openings disposed in the seat pad 8, namely shapes of the air permeable members 6 filled in the openings are exemplarily illustrated in approximately cylindrical shapes (since FIG. 1 and FIG. 2 are partially cutout perspective cross-sectional surfaces, halves of the approximately cylindrical shapes are illustrated). However, the openings or the air permeable members 6 may be provided in approximately rectangular shapes viewing from the top surface of the urethane pad 8. Thus a location of the opening and a count of the opening in the seat pad 8 can be appropriately designed according to a vehicle type and a usage.

Embodiment 2

Figure 3:
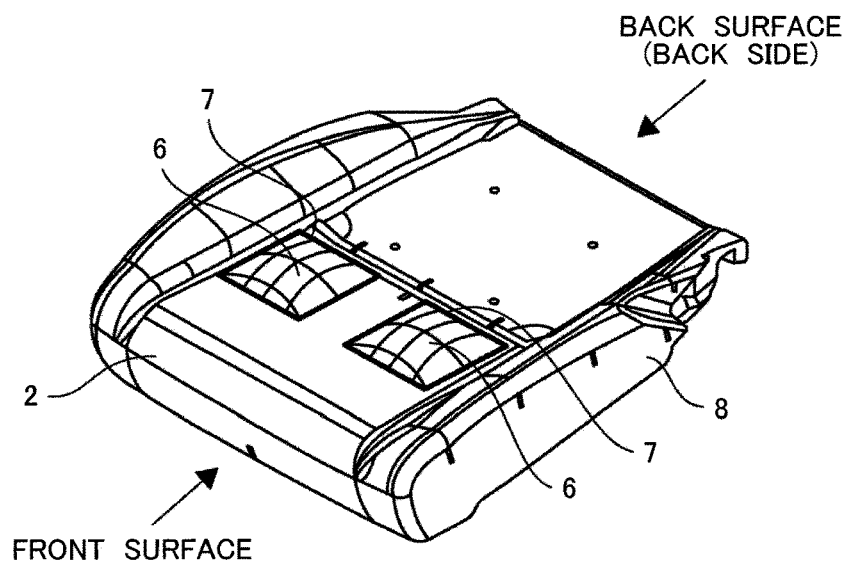
FIG. 3 is a perspective view of the vehicle seat according to the one embodiment of the present invention.
Figure 4:
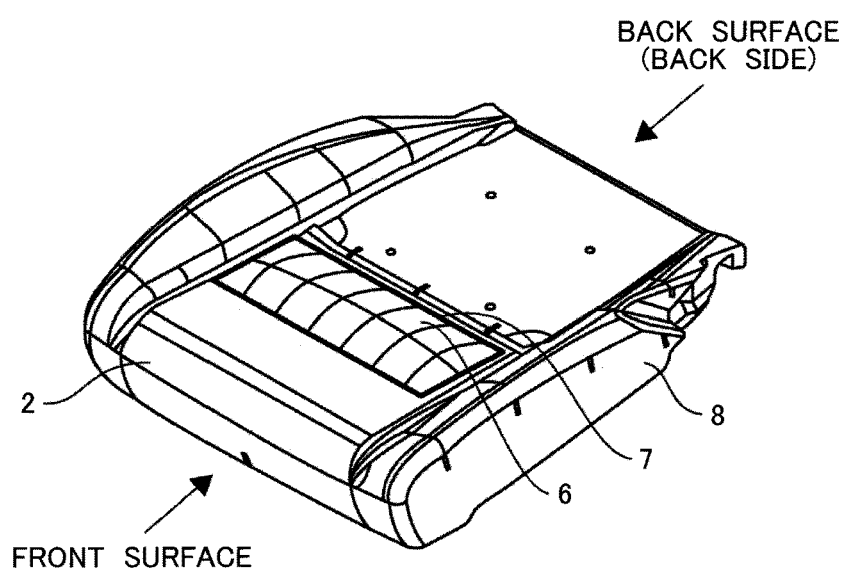
FIG. 4 is a perspective view of the vehicle seat according to the one embodiment of the present invention.

With reference to FIG. 3 and FIG. 4, the vehicle seat according to an embodiment 2 of the present invention will be described. Similar to FIG. 1, FIG. 3 and FIG. 4 illustrate a state where the seat cover (the trim cover) of the cushion pad 2 is removed in order to show the feature of the present invention in a simple manner.

The cushion pad 2 of the vehicle seat illustrated FIG. 3 and FIG. 4 has at least one or more openings that pass through a part of the seat pad 8 (the urethane pad), which serves as a cushion base, from the top surface to the lower surface. In FIG. 3, two openings are disposed. In FIG. 4, one large opening that looks like the two openings in FIG. 3 are connected is disposed. The openings in FIG. 3 and FIG. 4 have inner walls along which the covering members 7 made of the cloth material {the fabric (the nylon half), the nonwoven fabric} are disposed. It is similar to the cushion pad 2 described in the embodiment 1 in that the air permeable member 6 compressed via the cloth material {the fabric (the nylon half), the nonwoven fabric}, namely the covering member 7 is filled in the opening.

It is different from the cushion pad in the embodiment 1 in that positions of the openings, which are disposed in the respective seat pads 8 in FIG. 3 and FIG. 4, are disposed near a front surface of the cushion pad 2 so that a passenger's thighs come on top of the air permeable member 6 when the passenger seats.

It is also different from the cushion pad in the embodiment 1 in that the shapes of the openings disposed in the seat pad 8, namely the shapes of the air permeable members 6, are provided in the approximately rectangular shapes viewing from the top surface side of the seat pad 8.

As illustrated in FIG. 3 and FIG. 4, disposing the air permeable member 6 in the seat pad 8 near the front surface of the cushion pad 2 ensures causing the passenger's thighs to come on top of the air permeable member 6 when the passenger seats. This ensures improving the air permeability between the passenger's thighs and the cushion pad 2. Furthermore, since the surface of the air permeable member 6 projects from the urethane surface adjacent to the opening, a cushioning performance can be maintained even in a state where the passenger's thighs stay on the cushion pad 2 during a long-distance driving.

As described above, with the vehicle seat according to the embodiment 2, the air permeability and the cushion durability of the vehicle seat can be improved to ensure achieving the vehicle seat having excellent comfort in seating.

Embodiment 3

Figure 5:
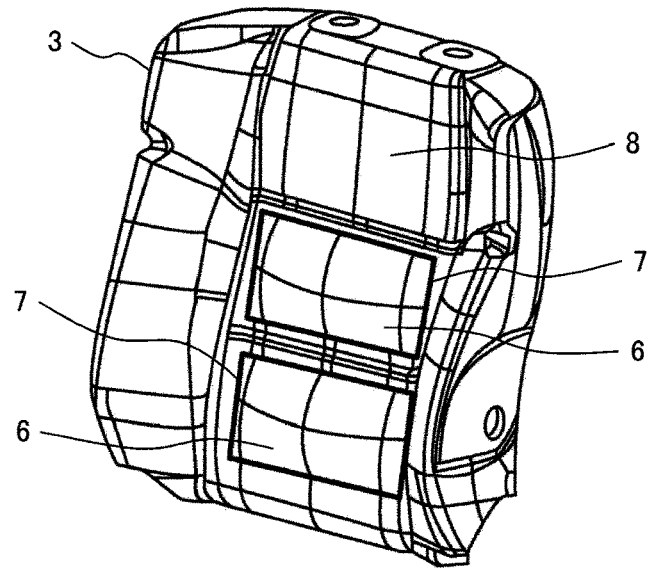
FIG. 5 is a perspective view of the vehicle seat according to the one embodiment of the present invention.
Figure 6:
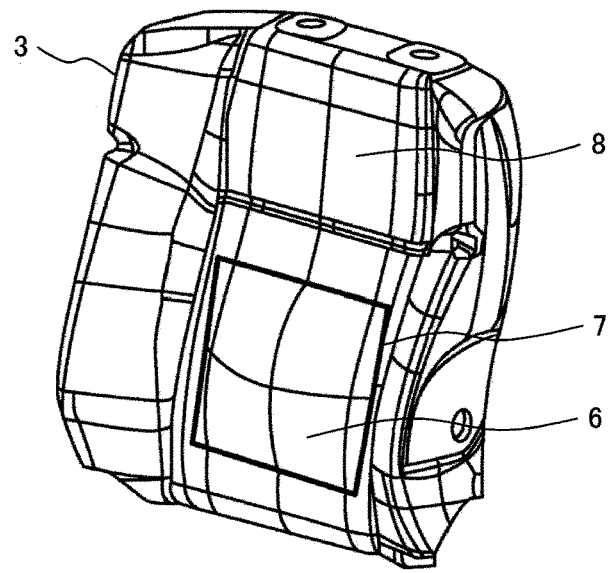
FIG. 6 is a perspective view of the vehicle seat according to the one embodiment of the present invention.

With reference to FIG. 5 and FIG. 6, the vehicle seat according to an embodiment 3 of the present invention will be described. Similar to the other embodiments, FIG. 5 and FIG. 6 illustrate a state where the seat cover (the trim cover) of the back pad 3 is removed in order to show the feature of the present invention in a simple manner.

The back pad 3 of the vehicle seat illustrated in FIG. 5 and FIG. 6 have at least one or more openings that pass through a part of the seat pad 8 (the urethane pad), which serves as a cushion base, from a top surface to a lower surface, namely from a surface of the back pad 3 where the passenger's back contacts through a back side of the back pad 3. In FIG. 5, two openings are disposed. In FIG. 6, one large opening that looks like the two openings in FIG. 5 are connected is disposed.

Similar to the embodiment 1 or the embodiment 2, the air permeable member 6 compressed via a covering member 5 made of the cloth material {the fabric (the nylon half), the nonwoven fabric} is filled in the opening disposed in the back pad 3.

As illustrated in FIG. 5 and FIG. 6, the openings disposed in the seat pad 8, namely the urethane pad are disposed near a lower portion side of the back pad 3 so that the passenger's back covers over the air permeable member 6 when the passenger seats.

Similar to the other embodiments, this air permeable member 6 also has its surface projecting from the top surface of the seat pad 8, namely the urethane surface adjacent to the opening on the surface where the passenger's back contacts. Therefore, the cushioning performance can be maintained even in a state where the passenger's back leans on the back pad 3 for a long time during a long-distance driving.

As described above, with the vehicle seat according to the embodiment 3, the air permeability and the cushion durability of the vehicle seat are improved to ensure achieving the vehicle seat having excellent comfort in seating.

Also in this embodiment, the shapes of the plurality of openings disposed in the seat pad 8, namely the shapes of the air permeable member 6 filled in the openings may be provided in the approximately cylindrical shapes other than the approximately rectangular shape illustrated in FIG. 5 and FIG. 6. That is, a location of the opening and a count of the opening in the urethane pad 8 can be appropriately designed according to a vehicle type and a usage.

Embodiment 4

With reference to FIG. 7A to FIG. 7D and FIG. 8, a method for manufacturing the cushion pad 2 or the back pad 3 described in the embodiment 1 to the embodiment 3 will be described.

Figure 7A:
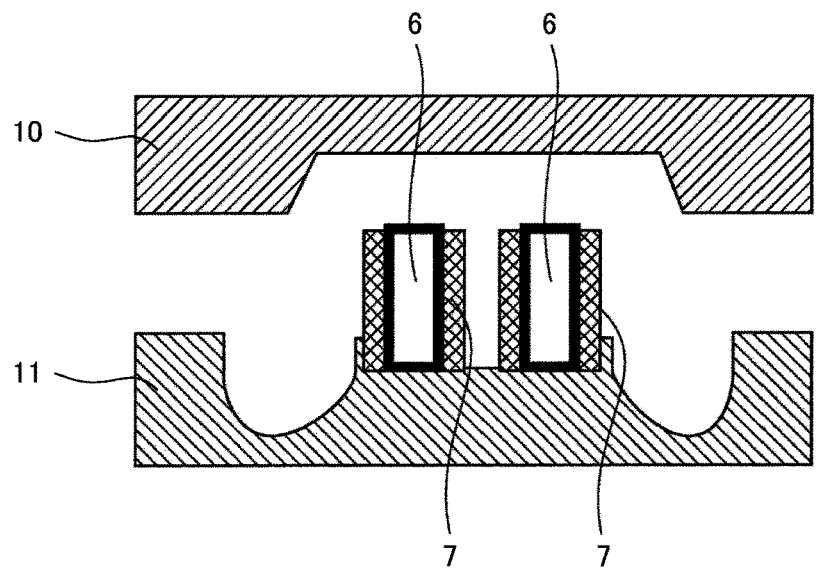
FIG. 7A is a diagram illustrating a manufacturing process of the vehicle seat according to the one embodiment of the present invention.

First, as illustrated in FIG. 7A, at least one or more air permeable members 6 is disposed in a cavity of a metallic mold constituted of the upper metallic mold 10 and a lower metallic mold 11. The air permeable member 6 is covered with the covering member 7 made of the cloth material {the fabric (the nylon half), the nonwoven fabric} on the side surface. The air permeable member 6 is arranged on the lower metallic mold 11 in the cavity of the metallic mold.

Here, in the case where the shape of the opening disposed in the seat pad 8, namely the shape of the air permeable member 6 is desired to be the approximately cylindrical shape like the cushion pad 2 described in the embodiment 1, the air permeable member 6, which is to be disposed in the cavity of the metallic mold and is covered with the covering member 7 on the side surface, having a shape formed into the approximately cylindrical shape is used.

When the shape of the opening disposed in the seat pad 8 of the cushion pad 2 or the back pad 3, namely the shape of the air permeable member 6 is desired to be the approximately rectangular shape as described in the embodiment 2 or the embodiment 3, the air permeable member 6, which is to be disposed in the cavity of the metallic mold and is covered with the covering member 7 on the side surface, having a shape formed into the approximately rectangular shape is used.

Also, when a location of the opening or a count of the opening in the urethane pad 8 is changed according to a vehicle type and a usage, the location or the count of this air permeable member 6, which is to be disposed in the cavity of the metallic mold and is covered with the covering member 7 on the side surface, is changed as necessary.

When the shape of the air permeable member 6 covered with the covering member 7 on the side surface is formed into the approximately cylindrical shape, the air permeable member 6 can relatively easily be formed into the approximately cylindrical shape by covering the air permeable member 6 with the cloth material {the fabric (the nylon half), the nonwoven fabric} on the side surface. Thus, the air permeable member 6 covered with the covering member 7 on the side surface can be easily formed.

When the air permeable member 6 covered with the covering member 7 on the side surface is formed into the approximately rectangular shape, a step and a jig are necessary to process into the approximately rectangular shape. However, it is possible to dispose the air permeable member 6 in a wide range in the urethane pad 8 compared with the approximately cylindrical shape.

Figure 7B:
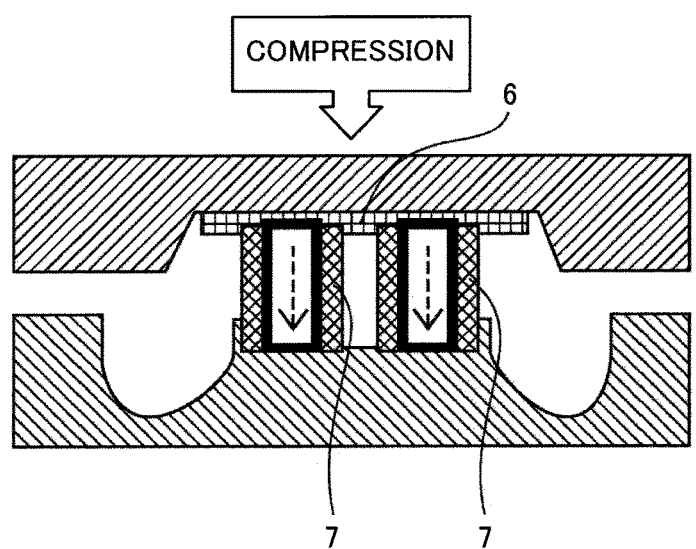
FIG. 7B is a diagram illustrating the manufacturing process of the vehicle seat according to the one embodiment of the present invention.

Next, as illustrated in FIG. 7B, the air permeable member 6 disposed in the cavity of the metallic mold is compressed together with the covering member 7 by the metallic mold. Here, as illustrated in FIG. 7B, the air permeable member 6 may be disposed on the upper portion of the metallic mold, namely the upper metallic mold 10 as the conventional manufacturing method and then be compressed together with the air permeable member 6 disposed on the lower metallic mold 11.

Figure 8:
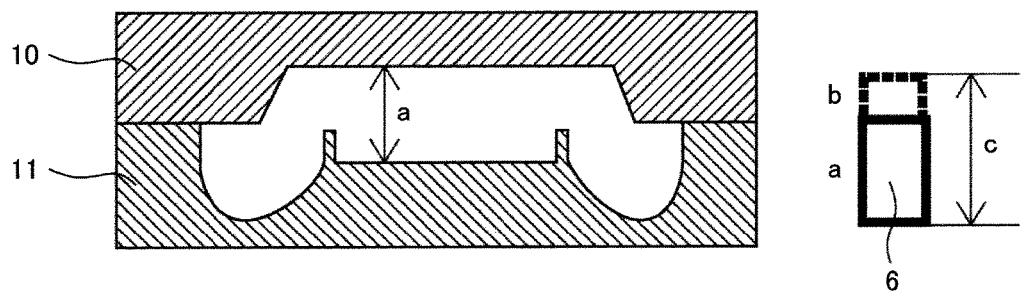
FIG. 8 is a diagram illustrating dimensions of a metallic mold and an air permeable member used in manufacturing the vehicle seat according to the one embodiment of the present invention.

FIG. 8 illustrates the relationship of dimensions of the metallic mold and the air permeable member 6 when the air permeable member 6 is compressed by the metallic mold. As illustrated in FIG. 8, the compression by the metallic mold is performed by causing the upper metallic mold 10 and the lower metallic mold 11 to be in close contact. The dimension in the cavity of the metallic mold when in compression is a. The dimension of the air permeable member 6 in a compressed state is a, which is identical to the dimension in the cavity of the metallic mold.

Here, forming the dimension of the air permeable member 6 disposed on the lower metallic mold 11 in the above-described FIG. 7A longer than the dimension a in the cavity of the metallic mold by b as illustrated in FIG. 8, that is, setting the dimension of the air permeable member 6 disposed on the lower metallic mold 11 to c, can reliably compress the air permeable member 6 when the air permeable member 6 is compressed by the metallic mold.

The relationship between the dimensions a, b, and c is a+b=c.

Figure 7C:
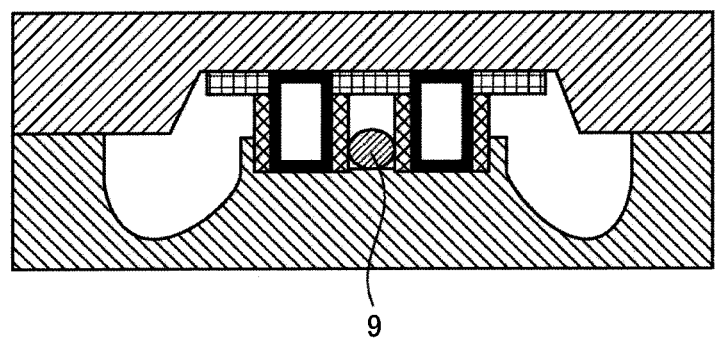
FIG. 7C is a diagram illustrating the manufacturing process of the vehicle seat according to the one embodiment of the present invention.
Figure 7D:
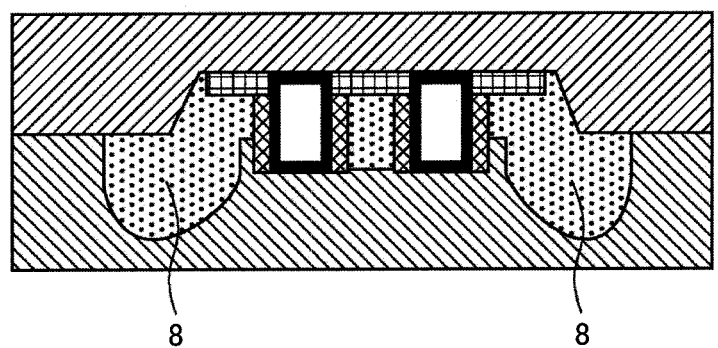
FIG. 7D is a diagram illustrating the manufacturing process of the vehicle seat according to the one embodiment of the present invention.

Next, as illustrated in FIG. 7C, while maintaining the compressed state of the air permeable member 6 disposed in the cavity of the metallic mold by the metallic mold, the urethane foamed resin 9 is filled into the cavity of the metallic mold by the conventional method. As illustrated in FIG. 7D, the urethane foamed resin 9 is foamed so that the air permeable member 6, the covering member 7, and the seat pad 8 combine together inside the cavity of the metallic mold.

The urethane foamed resin 9 uses an isocyanate solution, a polyol solution, and the like as main raw materials. The isocyanate solution, the polyol solution, and the like are poured into the cavity of the metallic mold while being mixed, and the chemical reaction of the mixed solution causes foaming.

Here, the cloth material {the fabric (the nylon half), the nonwoven fabric} covering the side surface of the air permeable member 6, namely the covering member 7 is impregnated with the urethane foamed resin 9 filled into the cavity of the metallic mold. Thus, adhesion between the seat pad 8 and the air permeable member 6 improves. That is, the urethane foam is formed inside the covering member 7 by the covering member 7 internally containing the urethane component, and the covering member 7 provides an adhesive function between the seat pad 8 and the air permeable member 6. Accordingly, the seat pad 8 and the air permeable member 6 are combined by the covering member 7 that is disposed at the boundary surface.

The cloth material {the fabric (the nylon half), the nonwoven fabric}, namely the covering member 7 also serves a function to prevent the air permeable member from losing the air permeability and the elasticity caused by the urethane foamed resin 9 excessively getting into the air permeable member 6 in the cavity of the metallic mold. That is, the covering member 7 is preferably constituted of an impregnation suppressing material having an ingress suppressing function against the urethane foamed resin 9 higher than that of at least the air permeable member 6. This ensures adjusting an amount of a pad member, namely the urethane foamed resin 9 absorbed in the air permeable member 6 to sufficiently achieve the air permeability and the durability of the air permeable member 6.

The illustration is omitted, but then the compression by the upper metallic mold 10 and the lower metallic mold 11 is released. Taking out the foamed seat pad 8 from the metallic mold completes the seat pad 8 (the urethane foam pad) filled with the air permeable member 6 via the covering member 7.

Afterwards, again the illustration is omitted, the trim cover (the seat cover) made of a skin material and a wadding (a batting) is attached to the urethane foam pad, namely the seat pad 8 filled with the air permeable member 6 via the covering member 7. Installing the urethane foam pad, namely the seat pad 8 filled with the air permeable member 6 via the covering member 7 onto a seat frame completes the vehicle seat.

Figure 9:
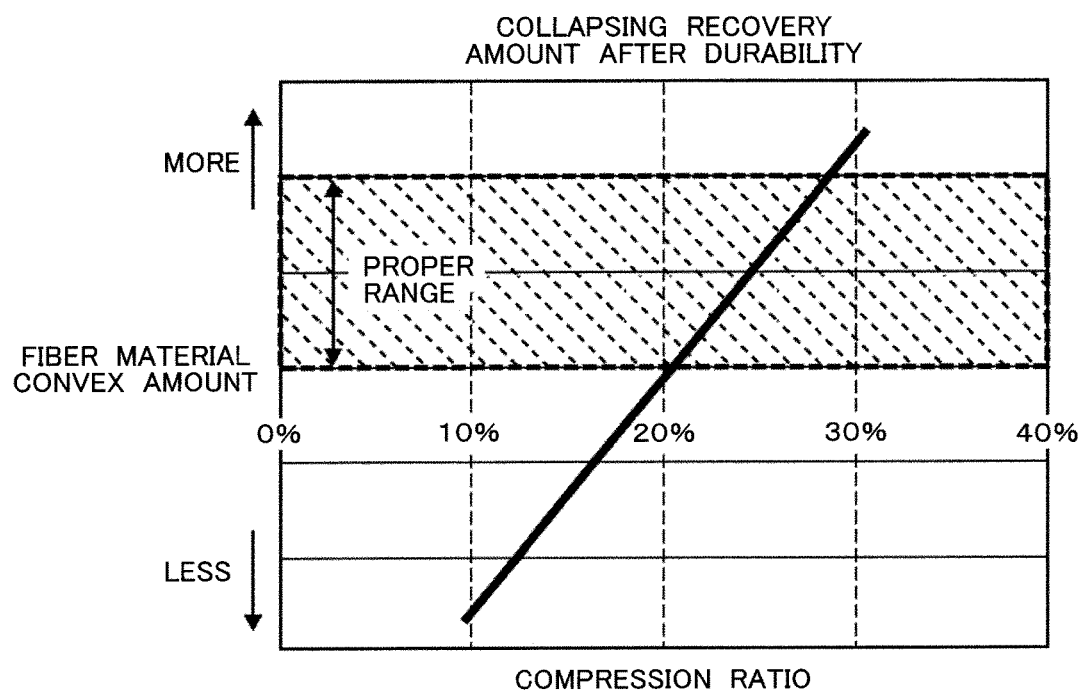
FIG. 9 is a diagram illustrating a relationship between a compression ratio of the air permeable member and a fiber material convex amount used in the vehicle seat according to the one embodiment of the present invention.

The relationship between a compression ratio of the air permeable member 6 and an amount of projection (a fiber material convex amount) of the air permeable member 6 from the urethane surface is illustrated in FIG. 9.

An evaluation illustrated in FIG. 9 used a urethane with 140 mm×140 mm×thickness of 50 mm having a fiber material (diameter of 70 mm, thickness of 50 mm) inserted in the center as a sample. As the testing method, the sample was compressed into half the thickness and left in 70° C. for 22 hours. As a measurement of the fiber material convex amount, the fiber material convex amount was a difference between an average of four corners of the sample and the thickest portion of the fiber material in 25° C. and 50%. As an evaluation standard, it was evaluated as no good when the fiber material convex amount becomes 0 mm or less within six hours after the durability test.

Setting the compression ratio of the air permeable member 6 compressed by the metallic mold to approximately 20% to 30% can make the amount of projection from the surface of the air permeable member 6 adjacent to the opening of the seat pad 8 the amount of projection with which the passenger feels comfortable. That is, forming the dimension c of the air permeable member 6 before the compression to be thicker by the dimension b with respect to the dimension a of the air permeable member 6 after the compression, that is, forming the dimension c thicker by approximately 20% to 30% of the dimension a can make the amount of projection of the air permeable member 6 fall within a proper range.

For this amount of projection of the air permeable member 6 surface from the seat pad 8 surface adjacent to the opening, it is preferable to set to 0 mm or more and 5 mm or less by considering the comfort of the passenger. This is achieved by setting the compression ratio of the air permeable member 6 to approximately 20% to 30% as described above, and this is for ensuring the amount of projection with which the passenger feels comfortable when seating as well as avoiding disfigurement of the seat caused by excessive amount of projection.

As described above, with the method for manufacturing the vehicle seat according to an embodiment 4, the air permeability and the cushion durability are improved to ensure manufacturing the vehicle seat having excellent comfort in seating.

The present invention is not limited to the above-described embodiments, and includes various modifications. For example, the above-described embodiments are described in detail for simply describing the present invention, and do not necessarily include all the described configurations. A part of the configurations of one embodiment can be replaced by the configuration of another embodiment. A part of the configurations of one embodiment can be used with the addition of the configuration of another embodiment. Regarding a part of the configurations in the respective embodiments, another configuration can be added, deleted, or replaced.

REFERENCE SIGNS LIST 1 vehicle seat,
2 cushion pad,
3 back pad,
4 head rest,
5 side support,
6 air permeable member,
7 covering member,
8 seat pad,
9 urethane foamed resin,
10 upper metallic mold,
11 lower metallic mold.

The invention claimed is:

1. A seat pad comprising:
an air permeable member having a ventilation function with an outside of the seat pad and having a covering member that covers at least a part of the air permeable member, the air permeable member being compressed by the covering member;
wherein the seat pad is integrally foam molded in a mold using a foamed resin material in a state where the air permeable member is disposed in the mold; and
wherein a surface of the air permeable member projects with respect to a surface of the seat pad located at a closest position to the air permeable member.

2. The seat pad according to claim 1, comprising:
wherein the covering member covers at least a part of the air permeable member at a boundary surface between the air permeable member and the foamed resin material; and
wherein the covering member is constituted of an impregnation suppressing material having an ingress suppressing function against the foamed resin material higher than that of at least the air permeable member.

3. The seat pad according to claim 1,
wherein the surface of the air permeable member projects with respect to the surface of the seat pad located at a closet position to the air permeable member by a distance greater than 0 mm but less than or equal to 5 mm.

4. The seat pad according to claim 1,
wherein the air permeable member is an organic fiber body.

5. The seat pad according to claim 1, wherein the seat pad is a cushion pad having a seating surface, and
the air permeable member is disposed at a forward direction side of the cushion pad.

6. The seat pad according to claim 1,
wherein the seat pad is a back pad having a backrest, and
the air permeable member is disposed at a lower portion side of the back pad.

7. The seat pad according to claim 1,
wherein the air permeable member is disposed divided into a plurality of portions of the seat pad.

8. A seat pad comprising:
a pad comprising a foamed resin material having at least one hole passing through a part of the pad from a first surface configured to be adjacent an occupant of the seat toward an opposite surface;
an air permeable member having a ventilation function with an outside of the seat pad provided in the at least one hole of the pad, the air permeable member having a portion projecting with respect to a portion of the first surface of the seat pad located closest to the air permeable member; and
a covering member that covers at least a part of the air permeable member, the air permeable member being compressed by the covering member.

9. The seat pad according to claim 8, comprising:
wherein the covering member covers at least a part of the air permeable member at a boundary surface between the air permeable member and the pad; and
wherein the covering member is constituted of an impregnation suppressing material having an ingress suppressing function against the pad.

10. The seat pad according to claim 8,
wherein the portion of the air permeable member projecting with respect to a portion of the first surface of the seat pad located closest to the air permeable member projects by a distance greater than 0 mm but less than or equal to 5 mm.

11. The seat pad according to claim 8,
wherein the air permeable member is an organic fiber body.

12. The seat pad according to claim 8, wherein the seat pad is a cushion pad having a seating surface, and
the air permeable member is disposed at a forward direction side of the cushion pad.

13. The seat pad according to claim 8,
wherein the seat pad is a back pad having a backrest, and
the air permeable member is disposed at a lower portion side of the back pad.

14. The seat pad according to claim 8,
wherein a plurality of air permeable members are provided in a plurality of holes of the pad.

15. The seat pad according to claim 8,
wherein the at least one hole passes completely through the part of the pad from the first surface to the opposite surface.

* * * * *